(12) United States Patent
Yan

(10) Patent No.: US 9,350,197 B2
(45) Date of Patent: May 24, 2016

(54) CHARGER AND ELECTRONIC DEVICE

(71) Applicant: HON HAI PRECISION INDUSTRY CO., LTD., New Taipei (TW)

(72) Inventor: Yu-Hu Yan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 198 days.

(21) Appl. No.: 13/949,233

(22) Filed: Jul. 24, 2013

(65) Prior Publication Data

US 2014/0152237 A1 Jun. 5, 2014

(30) Foreign Application Priority Data

Nov. 30, 2012 (TW) .................................. 101144881

(51) Int. Cl.
*H02J 7/04* (2006.01)
*H02J 7/00* (2006.01)

(52) U.S. Cl.
CPC ............... *H02J 7/045* (2013.01); *H02J 7/0036* (2013.01)

(58) Field of Classification Search
CPC ................................ H02J 7/0036; H02J 7/045
See application file for complete search history.

(56) References Cited

U.S. PATENT DOCUMENTS

| | | | |
|---|---|---|---|
| 6,605,925 B2 | 8/2003 | Tange et al. | |
| 7,791,315 B2 | 9/2010 | Sakurai et al. | |
| 2007/0007822 A1* | 1/2007 | Cioaca | H02J 7/0006 307/29 |
| 2009/0001935 A1* | 1/2009 | Odaohhara | H02J 7/045 320/134 |
| 2012/0262950 A1* | 10/2012 | Nate et al. | H02J 9/005 363/16 |

FOREIGN PATENT DOCUMENTS

| | | |
|---|---|---|
| CN | 1558524 A | 12/2004 |
| CN | 101212144 A | 7/2008 |
| TW | 200836454 | 9/2008 |
| TW | 201232991 | 8/2012 |
| TW | 201232991 A | 8/2012 |

* cited by examiner

*Primary Examiner* — Nha Nguyen
(74) *Attorney, Agent, or Firm* — Novak Druce Connolly Bove + Quigg LLP

(57) ABSTRACT

A charger includes a mains plug, a voltage conversion unit, a power port, a feedback resistor module, and a microprocessor. The power port includes a positive voltage pin, a negative voltage pin, and a control pin. The feedback resistor module is connected between the negative voltage pin, a feedback port of the voltage conversion unit, and ground. The microprocessor is connected to the control pin and the feedback resistor module. The feedback port of the voltage conversion unit outputs a constant voltage, and a current output by the charger is equal to a ratio between the constant voltage and a resistance value of the feedback resistor module. The microprocessor increases the resistance value of the feedback resistor module when receiving a first control signal, and decreases the resistance value of the feedback resistor module when receiving a second control signal.

11 Claims, 3 Drawing Sheets

CHARGER AND ELECTRONIC DEVICE

BACKGROUND

1. Technical Field

The present disclosure relates to a charger and an electronic device.

2. Description of Related Art

Portable devices, such as smartphones and tablet computers, are usually powered by a rechargeable battery. When the rechargeable battery is run out, it is needed to charge the rechargeable battery via a charger, such as a power adapter. The common charger is connected to a mains socket to obtain an alternating current (AC) voltage, and then converts the AC voltage to direct current (DC) voltage and charges the rechargeable battery by using the DC voltage. The portable device has a charge control circuit to receive the DC voltage and charge the rechargeable battery. However, a voltage and a current output by the charger are constant, and the voltage output by the charger is greater than a charge voltage for the battery, which results in power consumption of the electronic device. For example, assume the voltage output by the battery is 5 volts (V), the current is 1 ampere (A), and the charge voltage is 3.7 V, then the electronic device would consume a power of (5−3.7) V*1 A=1.3 W, which causes power waste. Another consideration is that if the power consumed by the electronic device increases, the heat generation would increase too, to easily damage the electronic device. Besides, when the charging process for the battery is finished, people usually forget to pull out the charger from the mains socket. When this happens, the charger still outputs a voltage when connected to the mains socket, which prolongs the consumption of power.

A charger and an electronic device to overcome the described limitations are thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described with reference to the accompanying drawings.

Figure 1:
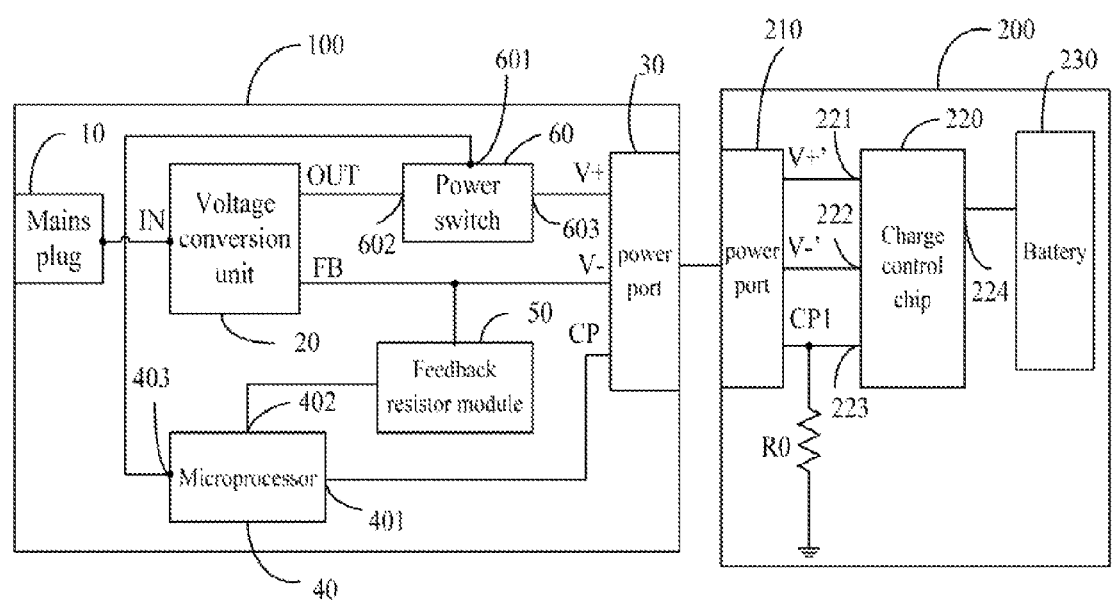
FIG. 1 is a schematic diagram of an embodiment of a charger and an electronic device connected to each other.

FIG. 1 illustrates a schematic diagram of a charger 100 and an electronic device 200 connected to each other. The charger 100 is connected between a mains supply (not shown) and the electronic device 200, and converts an alternating current (AC) voltage output by the mains supply to a direct current (DC) voltage for charging the electronic device 200.

As shown in FIG. 1, the charger 100 includes a mains plug 10, a voltage conversion unit 20, a power port 30, a microprocessor 40, and a feedback resistor module 50. The mains plug 10 connects to the mains supply and receives the AC voltage output by the mains supply. The voltage conversion unit 20 includes an input port IN, an output port OUT, and a feedback port FB. The voltage conversion unit 20 is connected to the mains plug 10 via the input port IN, the voltage conversion unit 20 converts the AC voltage received by the mains plug 10 to a DC voltage with a predetermined value.

The power port 30 connects to the electronic device 200, in the embodiment, the power port 30 includes a positive voltage pin V+, a negative voltage pin V−, and a control pin CP. The positive voltage pin V+ is connected to the output port OUT of the voltage conversion unit 20, the negative voltage pin V− is connected to the feedback port FB of the voltage conversion unit 20, the negative voltage pin V− and the feedback port FB are grounded via the feedback resistor module 50. The feedback port FB provides a constant voltage, such as 0.5 volts. In the embodiment, a current output by the output port OUT of the voltage conversion unit 20 is equal to a ratio between the voltage of the feedback port FB and a resistance value of the feedback resistor module 50.

The microprocessor 40 includes a detection port 401 and a first control port 402. The detection port 401 is connected to the control pin CP of the power port 30, and the first control port 402 is connected to the feedback resistor module 50.

The electronic device 200 includes a power port 210, a charge control chip 220, and a battery 230. The power port 210 also includes a positive voltage pin V+', a negative voltage pin V−', and a control pin CP1. When the power port 210 of the electronic device 200 is connected to the power port 30 of the charger 100, then the positive voltage pin V+', the negative voltage pin V−', and the control pin CP1 of the power port 210 are respectively connected to the positive voltage pin V+, the negative voltage pin V−, and the control pin CP of the power port 30.

The charge control chip 220 includes two input pins 221, 222, a control port 223, and an output pin 224. The two input pins 221, 222 are respectively connected to the positive voltage pin V+' and the negative voltage pin V−' of the power port 210. The control port 223 is connected to the control pin CP1 of the power port 210. The charge control chip 220 outputs a suitable voltage to charge the battery 230 via the output pin 224.

When the charger 100 is connected to the electronic device 200 to charge the battery 230 of the electronic device 200, the charge control chip 220 detects a current input by the power port 210. When the charge control chip 220 determines the current input by the power port 210 is less than a first predetermined value, the charge control chip 220 produces a first control signal and transmits the first control signal to the control pin CP of the charger 100 via the control pin CP1 of the power port 210. The microprocessor 40 decreases the resistance value of the feedback resistor module 50, when the detection port 401 of the microprocessor 40 detects the first control signal from the control pin CP of the power port 30. Thus, because the resistance value of the feedback resistor module 50 is decreased, the ratio between the constant voltage output by the feedback port FB and the resistance value of the feedback resistor module 50 is increased, and the current output by the output port OUT of the voltage conversion unit 20 is increased accordingly.

When the charge control chip 220 determines that the current input by the power port 210 is greater than a first predetermined value, the charge control chip 220 produces a second control signal and transmits the second control signal to the control pin CP of the charger 100 via the control pin CP1 of the power port 210. The microprocessor 40 increases the resistance value of the feedback resistor module 50 when the detection port 401 of the microprocessor 40 detects the second control signal from the control pin CP of the power port 30. Thus, because the resistance value of the feedback resistor module 50 is increased, the ratio between the constant voltage output by the feedback port FB and the resistance value of the feedback resistor module 50 is decreased, and the current output by the output port OUT of the voltage conversion unit 20 is decreased accordingly.

Therefore, in the present invention, the charger 100 can adjust the current output to the electronic device 200. Because the power output by the charger 100 is usually unchanged, when the current output to the electronic device 200 is changed, the voltage output by the charger 100 and the output to the electronic device 200 is also changed.

In the embodiment, the charger 100 also includes a power switch 60, the microprocessor 40 also includes a second control port 403. The power switch 60 includes a controlled terminal 601, a first path terminal 602, and a second path terminal 603. The controlled terminal 601 of the power switch 60 is connected to the second control port 403 of the microprocessor 40. The first path terminal 602 is connected to the output port OUT of the voltage conversion unit 20, and the second path terminal 603 is connected to the positive voltage pin V+.

When the charger 100 is connected to the mains supply but is not connected to the electronic device 200, the control pin CP of the power port 30 produces a third control signal. The microprocessor 40 outputs an off signal to the controlled terminal 601 of the power switch 60 to turn off the power switch 60 when the detection port 401 detects the third control signal. Therefore, the charger 100 stops outputting power.

When the charger 100 is connected to the mains supply and is also connected to the electronic device 200, the control pin CP of the power port 30 produces a fourth control signal. The microprocessor 40 outputs an on signal to the controlled terminal 601 of the power switch 60 to turn on the power switch 60 when the detection port 401 detects the fourth control signal. Therefore, the charger 100 outputs power.

In the embodiment, the electronic device 200 also includes a resistor R0, one end of the resistor R0 is connected to the control pin CP1 of the power port 210 and the control port 223 of the charge control chip 220, and the other end of the resistor R0 is grounded.

In the embodiment, the first control signal produced by the charge control chip 220 is a high voltage signal maintained for a time duration which is greater than a first period of time and less than a second period of time. Such as, the high voltage signal being maintained for between 1 and 2 seconds. The second control signal is a high voltage signal maintained for a time duration which is less than the first period of time. The third control signal is a high voltage signal maintained for a time duration which is greater than a third period of time. The fourth control signal is a low voltage signal.

In the embodiment, when the charger 100 is not connected to the electronic device 100, the control pin CP of the power port 30 is suspended and always at high voltage, thus producing the third control signal.

When the charger 100 is connected to the electronic device 100, the control pin CP of the power port 30 is grounded via the resistor R0 and at low voltage, thus producing the fourth control signal. The control pin CP1 of the power port 210 of the electronic device 200 is also grounded via the resistor R0 and outputs the low voltage signal at a normal state.

Figure 2:
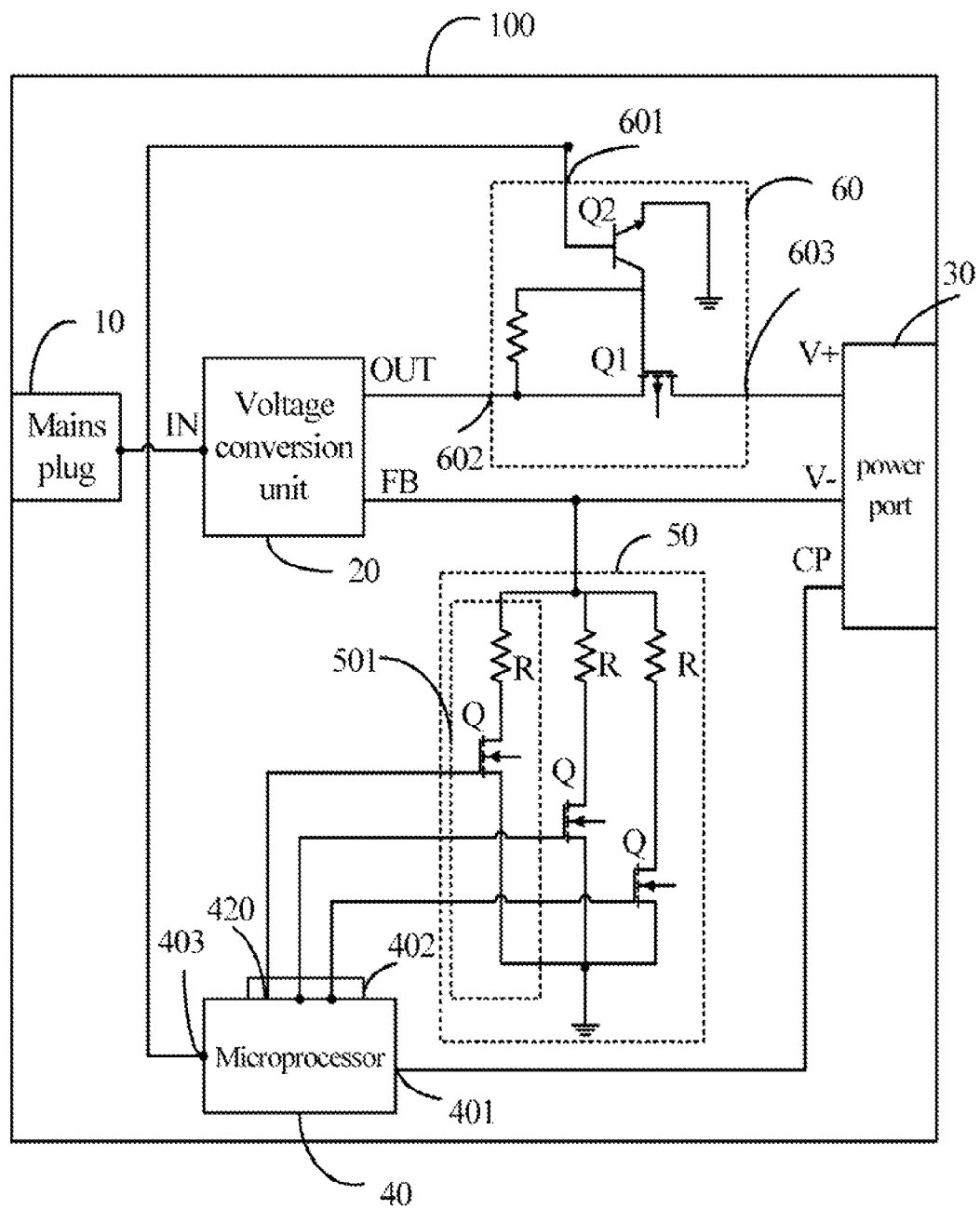
FIG. 2 is a circuit diagram of a first embodiment of a charger.

Referring to FIG. 2, a circuit diagram of the charger 100 is illustrated. In the embodiment, the feedback resistor module 50 includes a number of branches 501 connected between the negative voltage pin V− of the power port 30 and ground in parallel. Each branch 501 includes a resistor R and an n-channel metal oxide semiconductor (NMOS) field effect transistor (FET) Q connected between the negative voltage pin V− of the power port 30 and ground in series. The first control port 402 of the microprocessor 40 includes several control sub-ports 420. The number of the several control sub-ports 420 is equal to the number of the branches 501. A source of the NMOS FET Q of each branch 501 is grounded, a drain of the NMOS FET Q is connected to the resistor R, a gate of the NMOS FET Q is connected to one control sub-port 420. The microprocessor 40 outputs signals to the gates of the NMOS FETs Q via the control sub-ports 420 to control the NMOS FETs Q to turn on or off. Therefore, the microprocessor 40 changes the number of the NMOS FETs Q which are turned on by outputting signals via the control sub-ports 420, thus changing the resistance value of the feedback resistor module 50.

In detail, the microprocessor 40 increases the number of the NMOS FETs Q which are turned on, when the detection port 401 of the microprocessor 40 receives the first control signal. In greater detail, the microprocessor 40 controls at least one control sub-port 420 which is outputting a low voltage signal to change to output a high voltage signal, therefore, the control sub-port 420 controls the corresponding NMOS FET Q to turn on. Therefore, the whole branch 501 including the NMOS FET Q which is turned on is itself turned on, and the number of the resistors R of the feedback resistor module 50 which are made to work is increased, thus decreasing the resistance value of the feedback resistor module 50. As described above, the voltage output by the feedback port FB is constant, and the current output by the output port OUT of the voltage conversion unit 20 is equal to the ratio between the voltage of the feedback port FB and the resistance value of the feedback resistor module 50. Therefore, when the resistance value of the feedback resistor module 50 is decreased, the current output by the voltage conversion unit 20 is increased.

The microprocessor 40 decreases the number of the NMOS FETs Q which are turned on when the detection port 401 of the microprocessor 40 receives the second control signal. In more detail, the microprocessor 40 controls at least one control sub-port 420 which is outputting a high voltage signal to change to output a low voltage signal, therefore, the control sub-port 420 controls the corresponding NMOS FET Q to turn off. Thereby, the whole branch 501 including the NMOS FET Q which is turned on is itself turned off, and the number of the resistors R of the feedback resistor module 50 which are functioning is decreased, thus increasing the resistance value of the feedback resistor module 50. Therefore, when the resistance value of the resistance value of the feedback resistor module 50 is increased, the current output by the voltage conversion unit 20 is decreased.

As shown in FIG. 2, the power switch 60 includes a p-channel metal oxide semiconductor (PMOS) FET Q1 and a negative-positive-negative (NPN) bipolar junction transistor (BJT) Q2. A source of the PMOS FET Q1 is connected to the output port OUT of the voltage conversion unit 20 and constitutes the first path terminal 602. A drain of the PMOS FET Q1 is connected to the positive voltage pin V+ of the power port 30 and constitutes the second path terminal 603. A gate of the PMOS FET Q1 is connected to a collector of the NPN BJT Q2, an emitter of the NPN BJT Q2 is grounded, and a base of the NPN BJT Q2 is connected to the second control port 403 and constitutes the controlled terminal 601.

In the embodiment, the on signal is a high voltage signal and the off signal is a low voltage signal.

When the charger 100 is connected to the mains supply but is not connected to the electronic device 200, the control pin CP of the power port 30 is suspended and always at high voltage and outputs the third control signal accordingly. The microprocessor 40 outputs the off signal, namely the low voltage signal to the controlled terminal 601 of the power switch 60, and the NPN BJT Q2 is turned off because the base receives the low voltage signal. The PMOS FET Q1 is turned off because the gate of the PMOS FET Q1 is at high voltage. Thus, a connection between the output port OUT of the voltage conversion unit 20 and the positive voltage pin V+ is cut off, and the charger 100 stops outputting power.

When the charger 100 is connected to the electronic device 200, the control pin CP of the power port 30 is grounded via the control pin CP1 of the power port 210 of the electronic device 200 and the resistor R0, thus producing the fourth control signal. When the detection port 401 detects the fourth control signal and the microprocessor 40 determines that the power switch 60 is then turned off, the microprocessor 40 controls the second control port 403 to output the on signal, namely the high voltage signal to the controlled terminal 601 of the power switch 60. Then the NPN BJT Q2 is turned on, and the gate of the PMOS FET Q1 is grounded via the NPN BJT Q2 which is turned on. The PMOS FET Q1 is turned on accordingly and establishes a connection between the output port OUT of the voltage conversion unit 20 and the positive voltage pin V+ of the power port 30.

In another embodiment, the NMOS FET Q can be replaced by a NPN BJT, the PMOS FET Q1 can be replaced by a PNP BJT, and the NPN BJT can be replaced by a NMOS FET.

Figure 3:
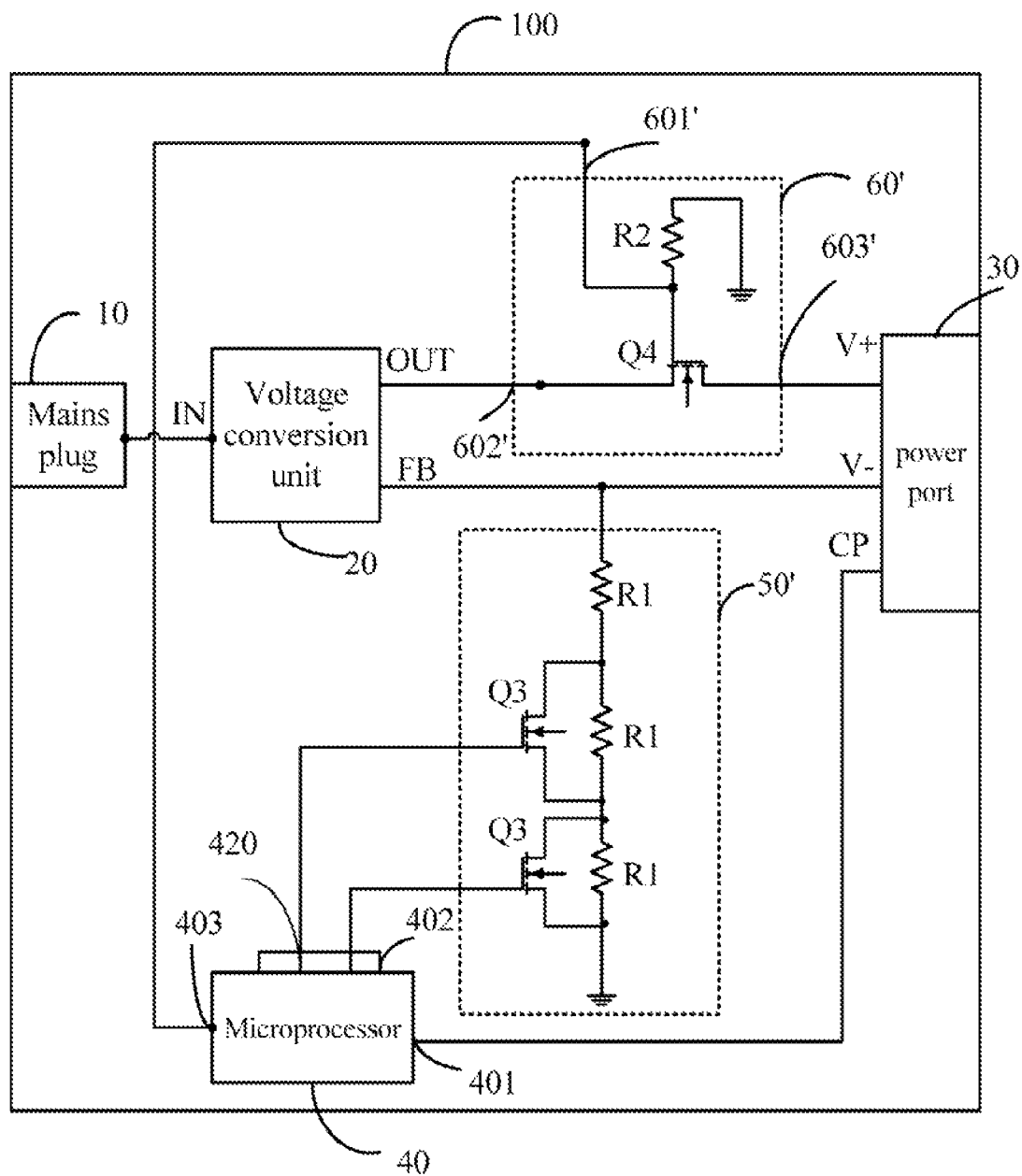
FIG. 3 is a circuit diagram of a second embodiment of a charger.

Referring to FIG. 3, a circuit diagram of the charger 100' of a second embodiment is illustrated. In the embodiment, the charger 100' includes the mains plug 10, the voltage conversion unit 20, the power port 30, the microprocessor 40 as shown in FIG. 2, the feedback resistor module 50', and the power switch 60'.

In a second embodiment, the feedback resistor module 50' includes a number of resistors R1 connected between the negative voltage pin V− and ground, and a number of NMOS FETs Q3. The number of the NMOS FETs Q3 is less than the number of the resistors R1. Each NMOS FET Q3 is connected between two ends of one resistor R1. In the second embodiment, the number of the control sub-port 420 is equal to the number of the NMOS FETs Q3, and each control sub-port 420 is connected to a gate of one NMOS FET Q3. A source and a drain of one NMOS FET Q3 are connected to the two ends of one resistor R1.

The microprocessor 40 increases the number of the control sub-ports 420 outputting the high voltage signal when the detection port 401 receives the first control signal. The number of the NMOS FET Q3 turned on is thus increased. Thus, more resistors R1 are bypassed and the resistance value of the feedback resistor module 50 is decreased and the current output by the output port OUT of the voltage conversion unit 20 is increased accordingly.

The microprocessor 40 decreases the number of the control sub-ports 420 outputting the high voltage signal when the detection port 401 receives the second control signal. The number of the NMOS FETs Q3 turned on is thus decreased. Thus, less resistors R1 are bypassed and the resistance value of the feedback resistor module 50 is increased and the current output by the output port OUT of the voltage conversion unit 20 is decreased accordingly.

As shown in FIG. 3, in a second embodiment, the power switch 60' includes a controlled terminal 601', a first path terminal 602', and a second path terminal 603'. The power switch 60' also includes an NMOS FET Q4 and a resistor R2. A source of the NMOS FET Q4 is connected to the output port OUT of the voltage conversion unit 20 and constitutes the first path terminal 602'. A drain of the NMOS FET Q4 is connected to the positive voltage pin V+ of the power port 30 and constitutes the second path terminal 603'. A gate of the NMOS FET Q4 is connected to the second control pot 403 and constitutes the controlled terminal 601'. The gate of the NMOS FET Q4 is also grounded via a resistor R2.

As described above, when the charger 100 is connected to the mains supply but is not connected to the electronic device 200, the microprocessor 40 outputs the low voltage signal to the controlled terminal 601' of the power switch 60', and the NMOS FET Q4 is turned off due to the base receiving the low voltage signal. Thus, a connection between the output port OUT of the voltage conversion unit 20 and the positive voltage pin V+ is cut off, and the charger 100 stops outputting power.

When the charger 100 is connected to the electronic device 200, the microprocessor 40 controls the second control port 403 to output the high voltage signal to the controlled terminal 601' of the power switch 60'. Then NMOS FET Q4 is turned on and establishes a connection between the output port OUT of the voltage conversion unit 20 and the positive voltage pin V+ of the power port 30.

Therefore, in the present invention, the charger 100 can adjust its own current output, the charger 100 also can stop outputting power when the charger 100 is connected to the mains supply but is not connected to the electronic device 200.

The electronic device 200 can be a mobile phone, a tablet computer, a notebook computer, digital camera, or the like.

It is understood that the present embodiments and their advantages will be understood from the foregoing description, and various changes may be made thereto without departing from the spirit and scope of the disclosure or sacrificing all of its material advantages, the examples hereinbefore described merely being embodiments of the present disclosure.

What is claimed is:

1. A charger, configured to charge an electronic device, the charger comprising:
    a mains plug configured to connect to a mains supply;
    a voltage conversion unit comprising an input port, an output port, and a feedback port, wherein, the voltage conversion unit is connected to the mains plug via the input port and is configured to convert an AC voltage received by the mains plug to a DC voltage with a predetermined value;
    a first power port configured to connect to the electronic device, wherein, the first power port comprises a positive voltage pin, a negative voltage pin, and a control pin, the positive voltage pin is connected to the output port of the voltage conversion unit, the negative voltage pin is connected to the feedback port of the voltage conversion unit;
    a feedback resistor module connected between the negative voltage pin and ground; and
    a microprocessor comprising a detection port and a first control port, wherein, the detection port is connected to the control pin of the first power port and is configured to detect signals of the control pin; the first control port is connected to the feedback resistor module;
    wherein, the feedback port provides a constant voltage, a current output by the output port of the voltage conversion unit is equal to a ratio between the voltage of the feedback port and a resistance value of the feedback resistor module; the microprocessor decreases the resistance value of the feedback resistor module, when the detection port of the microprocessor detects a first control signal from the control pin of the first power port; the microprocessor further increases the resistance value of the feedback resistor module, when the detection port of the microprocessor detects the second control signal from the control pin of the first power port.

2. The charger according to claim 1, further comprising a power switch, wherein the microprocessor further comprises a second control port, the power switch comprises a controlled terminal, a first path terminal, and a second path terminal, the controlled terminal of the power switch is connected to the second control port of the microprocessor, the first path terminal is connected to the output port of the voltage conversion unit, and the second path terminal is connected to the positive voltage pin.

3. The charger according to claim 2, wherein when the charger is connected to the mains supply but is not connected to the electronic device, the control pin of the first power port produces a third control signal, the microprocessor outputs an off signal to the controlled terminal of the power switch to turn off the power switch when the detection port detects the third control signal; when the charger is connected to the mains supply and further connected to the electronic device, the control pin of the first power port produces a fourth control signal, the microprocessor outputs an on signal to the controlled terminal of the power switch to turn on the power switch when the detection port detects the fourth control signal.

4. The charger according to claim 3, wherein, the first control signal is a high voltage signal maintained a time duration greater than a first period of time and less than a second period of time; the second control signal is a high voltage signal maintained a time duration less than the first period of time; the third control signal is a high voltage signal maintained a time duration greater than a third period of time; the fourth control signal is a low voltage signal.

5. The charger according to claim 1, wherein the feedback resistor module comprises a plurality of branches connected between the negative voltage pin of the first power port and ground in parallel; each branch comprises a first resistor and a first n-channel metal oxide semiconductor (NMOS) field effect transistor (FET) connected between the negative voltage pin of the first power port and ground in series; the first control port of the microprocessor comprises a plurality of control sub-ports, the number of the control sub-ports is equal to the number of the branches; a source of the first NMOS FET is grounded, a drain of the first NMOS FET is connected to the first resistor, a gate of the first NMOS FET is connected to one control sub-port; the microprocessor outputs signals to the gates of the first NMOS FETs via the corresponding control sub-ports to control the first NMOS FETs to turn on or off, thus changing the resistance value of the feedback resistor module.

6. The charger according to claim 1, wherein feedback resistor module comprises a plurality of second resistors connected between the negative voltage pin and ground, and a plurality of second NMOS FETs, the number of the second NMOS FETs is less than the number of the resistors; each second NMOS FET is connected between two ends of one of the second resistors; the first control port of the microprocessor comprises a plurality of control sub-ports, each control sub-port is connected to a gate of one second NMOS FET; a source and a drain of one second NMOS FET are respectively connected to two ends of one second resistor; the microprocessor outputs signals to the gates of the second NMOS FETs via the corresponding control sub-ports to control the second NMOS FETs to turn on or off, thus changing the resistance value of the feedback resistor module.

7. The charger according to claim 2, wherein, the power switch comprises a p-channel metal oxide semiconductor (PMOS) FET and a negative-positive-negative (NPN) bipolar junction transistor (BJT), a source of the PMOS FET is connected to the output port of the voltage conversion unit and constitutes the first path terminal; a drain of the PMOS FET is connected to the positive voltage pin of the first power port and constitutes the second path terminal; a gate of the PMOS FET is connected to a collector of the NPN BJT, an emitter of the NPN BJT is grounded, a base of the NPN BJT is connected to the second control port and constitutes the controlled terminal.

8. The charger according to claim 2, wherein the power switch comprises a third NMOS FET and a third resistor, a source of the third NMOS FET is connected to the output port of the voltage conversion unit and constitutes the first path terminal; a drain of the third NMOS FET is connected to the positive voltage pin of the first power port and constitutes the second path terminal, a gate of the third NMOS FET is connected to the second control pot and constitutes the controlled terminal; the gate of the third NMOS FET is also grounded via the third resistor.

9. The charger according to claim 2, wherein the electronic device connected to the first power port comprises: a battery, a second power port, and a charge control chip, the power port comprises a positive voltage pin, a negative voltage pin, and a control pin, the second power port is configured to connect to the first power port of the charger, the charge control chip comprises two input pins, an output pin and a control pin, wherein, the two input pins are respectively connected to the positive voltage pin and the negative voltage pin of the second power port, the output pin is connected to the battery; the charge control chip is configured to outputs a suitable voltage to charge the battery via the output pin; wherein, when the charge control chip determines the current input by the second power port is less than a first predetermined value, the charge control chip produces a first control signal to the control pin; when the charge control chip determines the current input by the second power port is greater than a second predetermined value, the charge control chip produces a second control signal to the control pin.

10. The charger according to claim 9, wherein the electronic device further comprises a resistor, one end of the resistor is connected to the control pin of the power port and the control port of the charge control chip, the other end of the resistor is grounded.

11. The charger according to claim 10, wherein the control pin of the power port is at low voltage by connected to ground via the resistor normally.

* * * * *